United States Patent
Schleif

[15] 3,639,810
[45] Feb. 1, 1972

[54] POWER SYSTEM MONITORING RELAY
[72] Inventor: Ferber R. Schleif, Denver, Colo.
[73] Assignee: The United States of America as represented by the Secretary of the Interior
[22] Filed: Feb. 18, 1971
[21] Appl. No.: 116,318

[52] U.S. Cl. ...................317/147, 307/152, 317/148.5 R, 340/253 Y, 340/262
[51] Int. Cl. ......................................................G08b 21/00
[58] Field of Search..................317/31, 49, 141 S, 147, 13, 317/154, 157; 307/129, 152, 233, 295; 324/78, 79; 340/253 Y, 262

[56] References Cited

UNITED STATES PATENTS

| | | |
|---|---|---|
| 3,546,533 | 12/1970 | Lydick..............................317/13 R |
| 3,311,835 | 3/1967 | Richman......................317/141 S UX |
| 3,235,800 | 2/1966 | Turrell..................................324/79 R |
| 3,064,189 | 11/1962 | Erikson et al. .......................324/79 R |

Primary Examiner—J. D. Miller
Assistant Examiner—Harry E. Moose, Jr.
Attorney—Ernest S. Cohen and Gersten Sadowsky

[57] ABSTRACT

An electrical power system subsidiary relay for controlling system normalizing and operation recording mechanisms which in response to detection by the relay of system frequency deviation from standard operating frequency derives in a differentiator-amplifier circuit component thereof an acceleration of deceleration signal predictive of system disturbance conditions. Adjustable devices in circuits interconnected with the differentiator-amplifier circuitry are settable to predetermine the sensitivity, or magnitude for response, and the minimal response and pickup timing for the relay.

6 Claims, 1 Drawing Figure

PATENTED FEB 1 1972
3,639,810
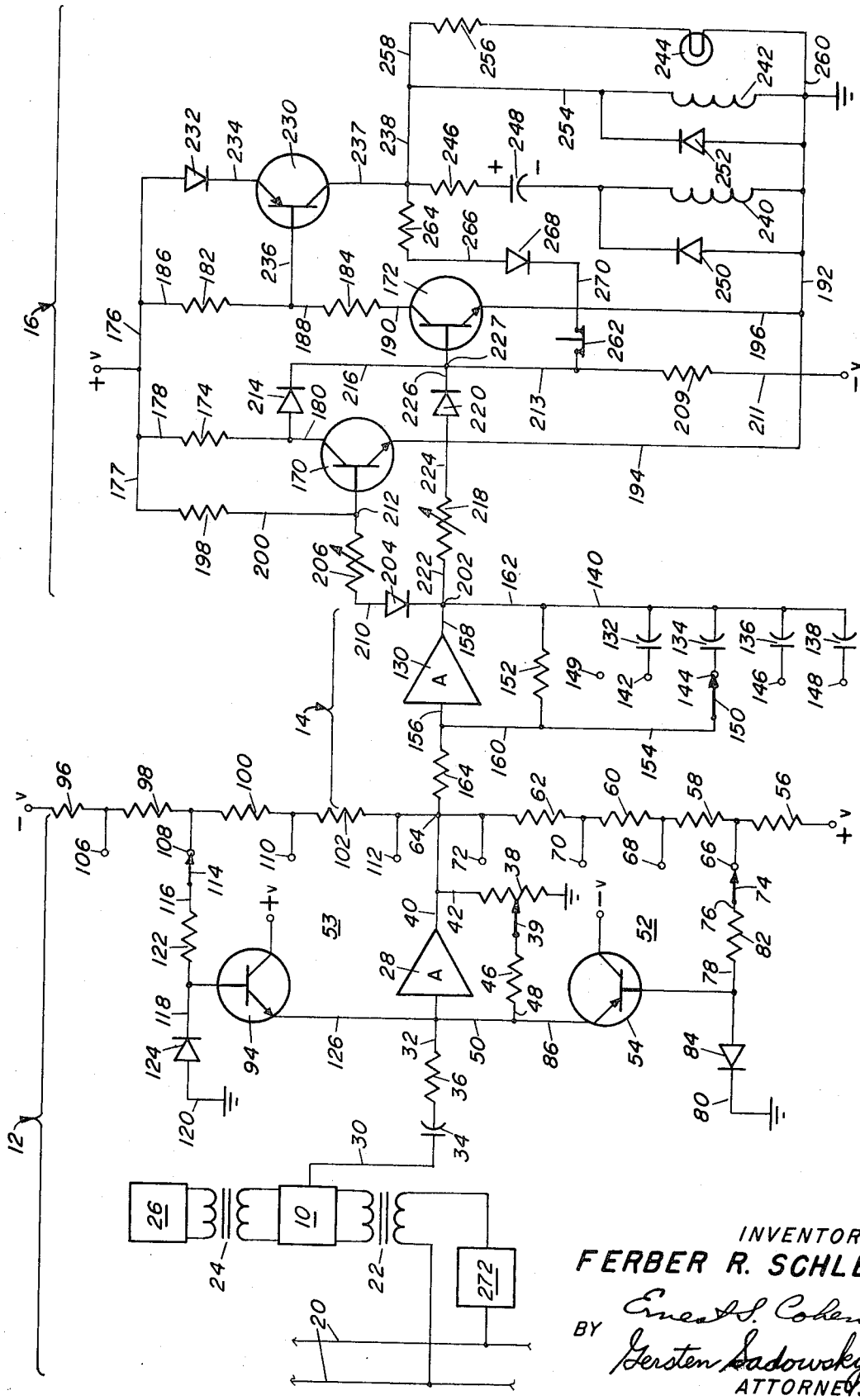
INVENTOR
FERBER R. SCHLEIF
BY Ernest S. Cohen
Gersten Sadowsky
ATTORNEYS

POWER SYSTEM MONITORING RELAY

The invention relates to electrical power generation monitoring equipment. In particular, the invention is adapted to reliably detect the stability characteristics of power generator operation by responding to generator frequency deviation from a standard frequency, and in accordance therewith it determines frequency acceleration and deceleration quantities which are applicable to direct operation of a relay device controlling regulating and recording mechanisms operatively associated with the power apparatus.

Power system dynamic data obtained by use of the present invention, particularly during actual system disturbances, have special utility in the analysis and control of system generator dropping and load-shedding procedures. Such data is also valuable for verifying dynamic system simulations by which the capability of a power system to tolerate or recover from a disturbance by corrective action can be demonstrably improved. It is known that measures to aid system recovery are most effective if initiated promptly, and consequently predictability of performance is essential for substantial improvement. However, such measures could be themselves disruptive to system operation where aid to recover the system from a severe anticipated contingency is initiated without the contingency actually developing. A substantial improvement of reliability in this respect is accomplished by the present invention through screening the control initiating signal, such as would be detected at the power generator output, during a preliminary short interval. Thus, distraction by severe generator acceleration or deceleration due to a local fault can be minimized by imposing timing limitations upon the effectiveness of the detected acceleration or deceleration signals in determining any corrective action. A slight delay in initiating control over corrective action so as to provide sufficient time for clearing and reclosing lines and switches after the local fault, can greatly reduce vulnerability to unnecessary counteracting operations.

As hereinbefore indicated, an important utility of the present invention is due to the leading or predictive nature of the acceleration or deceleration quantity developed therein from which can be determined the requisiteness of supervisory control in a power system as well as for the actuation of system operation indicators. This characteristic of the aforesaid control quantity appears from the expression, $$\alpha = 180(f)(\Delta P)/(H)(k.v.a.)$$

where, $\alpha$ is acceleration or deceleration in electrical degrees per second per second, $f$ is system frequency in Hz. $H$ is an inertia constant in kilowatts-seconds per k.v.a. of the generation machine, and $\Delta P$ is kilowatts available for acceleration or deceleration of the machine. Since for any given machine, acceleration is merely a function of $\Delta P$, the instant there is accelerating power, such as is due to faults or load and generation imbalance, there is simultaneously a corresponding acceleration. Quantities such as power flow, machine rotor angle, and line image impedance under dynamic conditions are all proportional to a time integration of acceleration, and since they are thus to be found lagging acceleration they can be predicted thereby.

Broadly, the apparatus of the present invention includes a sequence of interconnected signal adjustment and amplification circuits controlling the operation of a trip relay in response to a direct current signal which bears a predetermined relationship to the magnitude and sense of the deviation of power generation output frequency from a preestablished frequency for the power generated. Relay actuation is effective to place a recording arrangement into operation which can yield preevent data for the power system from analyses of records of the generated power and frequency deviation in respect to time considered together with a trace indicating generated power available in the related lines. A comparison of these field observations, which are obtainable during actual system disturbances, to computer predictions for dynamic response to the exigencies of power line loadings, facilitates gaining greater confidence and utility for such computer predictions, and manifests information on margins of safety. Where generator dropping is applicable to reduce the consequences of system disturbances, dropping signals, as would ordinarily arise from auxiliary contacts on local line circuit breakers or on local conventional relays, are at times transmitted from several points far from the generator locations and become subject to data channel malfunctioning which can result in unnecessary generator dropping. Utilization of the present invention at generator locations to supervise dropping effected by these remote system signals significantly improves the reliability of the overall arrangement. In one such arrangement where generator dropping is set up for plants at several locations, the remote signal, which conventionally would be initiated by a scheme anticipating the need for generator dropping early, is sent to each generation location having an acceleration relay or relays according to the present invention. Each acceleration relay is set to pick up at a predetermined acceleration level and only when this relay picks up would generation dropping by the remote signal be permitted. The acceleration relay settings are primarily based on the results of system dynamic studies and would not pick up to enable dropping in any event where the disturbance does not require such action.

Frequency deviation responsive relay devices have theretofore been used to avoid the accentuation of disturbances due to early recovery action in a faulted circuit. However, the controlling inputs to such devices have been derived from mechanical sensing of generator frequency. Reference to an article in the journal *Electrical World* of Apr. 6, 1940, pages 69 to 72, entitled "Inertia Relay Anticipates to Facilitate Reclosure," by J. T. Logan and J. H. Miles, reveals this type of relay device as having an inertia element rotated by a motor whose speed is controlled by the frequency of the power supply. Although the inertia element is driven in synchronism during operation at normal system frequency, it is free to be driven ahead of the driving shaft by the action of stored kinetic energy in opposition to friction losses when the driving shaft speed suddenly decreases due to a drop in system frequency. Circuit control contacts are provided which are operable upon a predetermined angular relation between the driving shaft and inertia element, these contacts being adjustable for obtaining operation in from 2 cycles to several seconds, depending upon the contact adjustments and the rate of speed retardation of the driving shafts. As further disclosed, this relay has utility in circuitry determining a control for sectionalization of load areas so to leave load within capacity on a local generating plant when the supplemental power source, such as a transmission line, is interrupted, and the dropping of synchronous apparatus, or the removal of its excitation sources, preparatory for immediate reclosure of source circuits after trip outs.

The aforementioned electromechanical design for a power system monitoring relay is not sufficiently accurate, sensitive or convenient for the needs of advanced power systems. Greater accuracy is achieved by the monitoring relay of the present invention where controlling input is derived from generator voltage sensed by a frequency transducer and applied to produce a signal proportional to the voltage frequency deviation from a standard 60 Hz. The frequency deviation signal is operated upon by a differentiator stage to derive a differential signal proportional to rate of change of frequency deviation, or its acceleration or deceleration. Further, a conditioning of this differential signal to achieve greater sensitivity and convenience in adapting the invention to the requirements of actual usage, is interposed by circuitry functioning to set an operational sensitivity for the relay, limit the magnitude of the differentiator output sufficiently to preclude an effective output before the elapse of a predetermined minimum time so as to avoid for the selected time possible premature tripping of the relay by extreme accelerations or decelerations of frequency deviation, and enable the setting of a time constant therein which would preclude the start of an output relay pickup for a time sufficient to avoid inaccuracies introduced by possible transient conditions. The effective differential signal response is determinable by the operational sensitivity adjustment which can range widely from that due to extreme accelerations approaching load rejection in the power system to rather modest accelerations indicative of remote or minor disturbances of the system for which starting of auxiliary control or recording may be needed. Coordination of relay action follows from its operational characteristics based on a time constant setting for which operating time to pickup is comparatively long for relatively low-differential signals, and pickup time becomes progressively less for higher differential signal until the set minimum operating time is reached.

It is therefore an object of the present invention to provide a circuit arrangement for monitoring a rate of change of frequency deviation, which circuit is conveniently adjustable for operation over a wide range of sensitivities.

Another object of the invention is to provide a power system generator acceleration and deceleration relay control having adjustable limits aiding discrimination by obtaining therein immunity to high but brief accelerations and decelerations.

These and other objects will more fully appear from reference to the accompanying figure, showing schematically the circuits of the present invention, and to the detailed description thereof which follows.

Referring now to the drawing, the general organization of the acceleration relay apparatus disclosed herein is shown as a combination of interacting stages which are identifiable by the circuit structures thereof pertaining to a frequency deviation transducer 10, a differentiator 12, an adjustable time constant 14, and a signal level detector and relay drive 16 which are operable together by way of conventional coupling circuitry, connections to terminals +v and −v at the positive and negative poles of a common direct current voltage source, and to a common internal ground conventionally designated in the figure. The basic input quantity to the relay apparatus is a 60 Hz. alternating current voltage obtained from the bus line 20 of a power generation station and transmitted to transducer 10 by way of the secondary of a potential transformer 22 connected to the bus line. A further potential transformer 24 electrically couples transducer 10 to a standard frequency source 26 which supplies the transducer with a reference voltage of 60 Hz. to which the basic input voltage is compared in the transducer for deriving its frequency deviation output signal. Transducer 10 accurately determines the zero crossings of the basic input voltage and generates a bipolar direct current signal which is proportional to frequency deviation from 60 Hz. Thus, in one form of a transducer of this type frequency deviation above 60 Hz. gives rise to a positive output, and below 60 Hz. gives rise to a negative output. Since the transducer is precisely balanced, and its output signal is independent of system voltage, this output is normally maintained at zero when the system voltage is at 60 Hz. Frequency transducers having operating characteristics allowing their adaptation for use in a present invention are known in the art, examples of which are disclosed in U.S. Pat. No. 3,064,189, issued Nov. 13, 1962, to E. W. Erikson et al., and U.S. Pat. No. 3,235,800, issued Feb. 15, 1966, to J. W. Turrell.

Differentiator stage 12 includes an operational amplifier 28, which receives the frequency deviation signal output from transducer 10 in a circuit comprising leads 30 and 32 which serially connect an input capacitor 34, and a resistor 36. An operational threshold or sensitivity level for amplifier 28 is settable by a gain adjustment circuit including a potentiometer 38 connected by leads 40, 42 and 44 between the amplifier output and ground. Potentiometer voltage is tapped in a feedback circuit which extends through a resistor 46 and completed on leads 48 and 50 connected to amplifier input lead 32. Differentiator stage 12 also functions in accordance with the influence thereon of an acceleration limiting circuit 52, and a deceleration limiting circuit 53. Limiting circuit 52 is made up of a PNP-transistor 54 in an amplifier feedback circuit including a set of serially connected resistors 56, 58, 60, and 62, having one end terminal connected to positive voltage source +v, and its opposite end terminal connected to amplifier output lead 40 at a circuit juncture 64. Leads from between the several resistors of the set, and between resistor 62 and juncture 64, are respectively connected to separate terminals 66, 68, 70, and 72, of a switch comprising an adjustable tap 74. The base of transistor 54 is connected in circuitry comprising leads 76, 78, and 80, extending to switch tap 74 by way of a resistor 82, and to ground by way of a diode 84. The transistor collector is connected to a negative source −v, and has its emitter in circuitry comprising leads 86 and 50 connected to amplifier input lead 32. Limiting circuit 53 is made up of a NPN-transistor 94 in an amplifier feedback circuit including a set of serially connected resistors 96, 98, 100, and 102, having one end terminal connected to a negative voltage source −v, and its opposite end terminal connected to amplifier output lead 40 at circuit juncture 64. Leads from between the several resistors of the set, and between resistor 102 and juncture 64, are respectively connected to separate terminals 106, 108, 110, and 112, of a switch comprising an adjustable tap 114. The base of transistor 94 is connected in circuitry comprising leads 116, 118, and 120, extending to switch tap 114 by way of a resistor 122, and to ground by way of a diode 124. Transistor 94 is connected at its collector to a positive source +v, and circuitry including lead 126 connects the emitter of the transistor to amplifier input lead 32.

Time constant stage 14 includes an operational amplifier 130, and a feedback circuit therefor in which provision is made for selecting a feedback circuit capacitor from among capacitors 132, 134, 136, and 138, which in order have progressively increasing capacitances. These capacitors are individually connected in separate circuits which at one end are connected in common to a lead 140, and at their other ends are individually connected to terminals 142, 144, 146, and 148, respectively, of a step switch conducting through an adjustable tap 150. A resistance 152, with its connections between lead 140 and a lead 154 extending from switch tap 150, is in a parallel circuit with a selected one of the capacitors which constitutes the time constant selection arrangement to be hereinafter more fully explained. The appertaining feedback circuit is completed between input and output leads 156 and 158, respectively, of amplifier 130 by further leads 160 and 162 connected to leads 154 and 140, respectively. Voltage output at junctive 64 of differentiator stage 12 is received on input lead 156 of time constant stage 14 by way of a coupling resistor 164.

The signal sensing portion of level detector and driver stage 16 comprises a pair of NPN-transistors 170 and 172, which respond to a deceleration trip signal and an acceleration trip signal, respectively, as will be hereinafter more fully explained. Positive voltage source +v is applicable to the collector of transistor 170 by way of a resistor 174 in circuitry comprising leads 176, 178, 180, and to the collector of transistor 172 by way of resistors 182 and 184 in circuitry comprising leads 176, 186, 188 and 190. The emitter electrodes of the transistors are both connected to a ground lead 192 through leads 194 and 196, respectively. The base of transistor 170 is connected to positive voltage source +v by way of a resistor 198 in circuitry comprising leads 176, 177 and 200, and to the acceleration or deceleration trip signal voltage present at a time constant stage output juncture 202, by way of a diode 204 and a variable resistor 206 in circuitry comprising leads 208, 210, and 212. The base of transistor 172 is connected to negative voltage source −v by way of resistor 209, in circuitry including leads 211 and 213, and is coupled to the collector of transistor 170 by way of a diode 214 in circuitry comprising leads 180 and 216. This transistor base is also connected to the trip signal output juncture 202 by way of a variable resistor 218 and a diode 220 in circuitry comprising leads 222, 224, and 226.

The driver portion of stage 16 includes a PNP-transistor 230 having its emitter connected to the positive source of voltage +v by way of a diode 232 in circuitry comprising leads 176 and 234. The base of transistor 230 is coupled to the collector of transistor 172 by way of a resistor 184 in circuitry comprising leads 236, 188 and 190. The collector of transistor 230 is connected by way of lead 237 to a further lead 238 having extended between it and ground lead 192 separate parallel circuits for each of relay coils 240 and 242, and an indicator lamp 244. The circuit of coil 240 includes a resistor 246 having one end connected to lead 238 and an opposite end serially connected to a capacitor 248 which in turn is connected to the coil. A diode 250, having an anode grounded at lead 192, is further connected in parallel with coil 240, and a diode 252 is correspondingly connected in parallel with coil 242, and further connected to lead 238 by a lead 254. Lamp 244 and a resistor 256, in series therewith, are connected by leads 258 and 260 to lead 238 and ground lead 192, respectively. A normally closed, double pole switch 262 is provided to operate a relay reset circuit which extends between the collector of transistor 230 and the base of transistor 172, and is traceable on leads 237 and 238, through a resistor 264, a lead 266, a diode 268, a lead 270, and a lead 213.

In furtherance of the disclosure of the operation of the present invention references are hereinafter made to specific numerical values for applicable electrical quantities, as well as to size, capacity, and other identification of electronic components which have pertinence to the particular embodiment of the invention disclosed herein. Obviously, other embodiments of the invention affected by different electrical quantities and structured by other electrical components having size and capacity adequate for the appertaining requirements thereof, will be readily evident from the instant disclosure. To transducer 10 are transmitted a 60 Hz., 115 volt power system potential from system bus 20, by way of potential transformer 22, and a reference 60 Hz., 115 volt potential from a standard frequency source 26, by way of potential transformer 24. In response to the inputs thereto transducer 10 produces on line 30 a direct current signal output having a magnitude and sense representative of the frequency deviation between the frequencies of the bus and standard voltages. Specifically, an output of 2 volts DC equals 1 Hz. difference, and a frequency rise in the bus voltage causes a positive signal whereas a frequency drop in the bus voltage causes a negative signal.

The series circuit including input capacitor 34, of 2 microfarads, and resistance 36, of 10 kΩ, which acts to effectuate differentiation at the input of stage 12, also provides a short time constant $T_1$ of 0.02 seconds having the effect of minimizing input signal noise. Differentiator stage 12 further comprises potentiometer 38, of 10 kΩ, which is connected through 150 kΩ resistor 46 in the feedback circuit of operational amplifier 28, and is operable to adjust amplifier gain in a conventional manner. A linear relationship characterizing this adjustment permits a convenient dial device to set potentiometer tap 39 within a range of sensitivities from 1,800°/sec/sec, to a maximum sensitivity of 25°/sec/sec acceleration or deceleration. To facilitate a desirable operational coordination, tripping on brief accelerations is avoided by providing the relay with a range of inverse time characteristics which are determinable when output from differentiator stage 12 is conditioned in acceleration and deceleration limiting circuits 52 and 54, respectively. Thus, switching tap 74 in circuit 52 is adjustable to contact a selected one of the terminals 66, 68, 70, or 72, whereat a minimum or limited time is set for the purpose of allowing the relay to ignore for a fixed time extreme accelerations that might otherwise cause premature tripping. Switch tap 114 is similarly adjustable to contact any one of terminals 106, 108, 110, and 112. Energizing voltage ±v, of ±15 volts, is supplied to the circuits serially connecting the resistances and the aforesaid multiple terminals interspersed between them. Limiting circuit 52 includes resistance 56, of 12 kΩ, resistance 58, of 2.7 kΩ, resistance 60, of 1.8 kΩ, and resistance 62, of 3.6 kΩ. Limiting circuit 54 includes resistance 96, of 12 kΩ, resistance 98, of 2.7 kΩ, resistance 100, of 1.8 kΩ, and resistance 102, of 3.6 kΩ. In the circuitry completing limiting circuits 52 and 54, including terminals 72 and 112 connected to amplifier output 28 output juncture 64, are switching taps 74 and 114, connected to transistors 54 and 94, respectively, at base electrodes thereof, by way of 20 kΩ resistors 76 and 122, respectively. The transistors are further connected, at the emitter electrodes thereof, by way of leads 86 and 126, respectively, to input lead 32 of amplifier 28.

The influence of the limiting circuit resistance upon the operation of the differentiator stage is coordinated with the effect produced by time constant stage 14 in accordance with the adjustment of its switching tap 150. The respective terminals 142, 144, 146 and 148 are selectable by the switching tap to place either capacitor 132, of 0.05 microfarads, capacitor 134, of 0.10 microfarads, capacitor 136, of 0.15 microfarads, or capacitor 138, of 0.20 microfarads, in parallel with resistance 152, of 1 megohm, to constitute an RC circuitry in the feedback circuit for amplifier 130 which determines a time constant $T_2$ corresponding in seconds to the numerical value of the microfarads rating of the selected capacitor. Provision for a zero time constant is made at an open terminal 149. Thus, the time delays made available by the $T_2$ settings are 0.0, 0.05, 0.1, 0.15, and 0.2 seconds.

Level detector and driver stage 16 is essentially a snap action voltage comparator which functions to apply voltage +v to energize relay coils 240 and 242, and lamp 244. Stage input passes through variable resistors 206 and 218, each of 20 kΩ, which are set to cooperate with resistor 198, of 30 kΩ, and resistor 209, of 30 kΩ, in a triggering circuitry for NPN-transistors 170 and 172. Further biasing components include resistor 174, of 10 kΩ, and resistors 182 and 184, each of 4.7 kΩ. Circuitry provided for the aforementioned energizing function further includes resistor 256 of 665 ohms, and capacitor 248, of 10 microfarads. A reset circuit for the relay includes resistor 264 of 10 kΩ. In the exemplary embodiment illustrated in the figure of the drawing all NPN-transistors are of the 2N2219 type, all PNP-transistors are of the 2N2905 type, all diodes are of the 1N484A type, and both operational amplifiers are of the SQ10a type.

Proceeding with a typical operation of the present invention, finds frequency deviation indicative of acceleration giving rise to a positive signal on transducer output lead 30. The rate of change of the transducer signal is reflected in the magnitude of an acceleration signal produced by the differentiator circuitry including capacitor 34 and resistor 36. Additionally, capacitor 34 inherently blocks steady-state direct current components of the frequency deviation signal rendering the differentiator inherently immune to possible steady-state offset or slow drift in transducer 10. The differentiator signal on lead 32 is presented as positive input to inverting amplifier 28 and a negative potential output provided on lead 40 is fed to the amplifier feedback circuit including sensitivity control potentiometer 38, and resistor 36 in leads 50 and 32. Since signal input to the amplifier on lead 32 is opposed by the feedback signal in accordance with the appertaining resistance circuitry, the reducing factor made applicable thereby in the gain of amplifier 28 is determinable by adjustment of potentiometer 38. Thus, enabling increased feedback by setting the potentiometer with decreased resistance obtains increased sensitivity since a relay tripping response by amplifier 28 to the relatively lesser voltages of low acceleration is then possible, whereas in the event of extreme acceleration the resultant relatively high feedback current would preclude the relay tripping response by the amplifier. However, an appropriate increase in potentiometer resistance can diminish feedback current to where relay tripping is obtained from relatively high voltages of extreme accelerations.

The further amplifier feedback circuit 52 is settable to determine acceleration minimum times; that is to select a time from signal start during which no relay pickup is obtained regardless of the magnitude of acceleration giving rise to the signal. Limiting circuit 52 in effect determines the magnitude of the amplifier output at juncture 64 which directs the operation of time constant stage 14. More particularly, for a given setting of time constant switching tap 150 to a selected one of the terminals 142, 144, 146, and 148 of capacitors 132, 134, 136, and 138 respectively, so as to predetermine the timing action of filter circuitry including the selected capacitor and resistor 152 in the feedback circuit of amplifier 130, the magnitude of the input on lead 156 to this time constant amplifier ultimately determines a time $T_2$ in which the potential at the time constant output juncture 202 reaches a sufficient magnitude to activate level detector and driver stage 16. Accordingly, to aid in relay coordination limiting circuit switching tap 74 is adjusted with respect to terminals 66, 68, and 70 so as to preset a voltage ratio in the voltage divider comprising resistors 56, 58, 60 and 62, which determines a minimum time based on time constant time $T_2$. In the example illustrated herein, connections to terminals 66, 68, and 70 are selectable to provide minimum times $T_2/4$, $T_2/2$, and $T_2$ respectively. However, an adjustment to furthest terminal 72 eliminates any possible response to an acceleration signal, as will be hereinafter more fully explained.

Feedback current in limiting circuit 52 is amplified by PNP-transistor 54 in response to a positive potential acceleration signal in the circuit which forward biases its base-emitter circuit, and wherein collector bias $-v$ determines the cutoff point of the amplification. Negative feedback current in circuit 52, as determined by the resistance ratio setting of voltage divider tap 74, flows in the circuit completed through leads 76, 78, 86 and 50 so as to oppose the buildup of positive potential acceleration signal on lead 32. In effect, the setting of the voltage divider is determinative of the time interval in which charging of capacitor 132, 134, 136 or 138 is sustained. Thus, the larger resistance ratio setting at terminal 66 reduces the opposing feedback current to the extent that the effective output from the differentiator stage occurs in the relatively lesser time of $T_2/4$, whereas the increased feedback current made effective by low-ratio resistance setting at terminal 70 provides the relatively longer $T_2$ minimum time. Further, a setting at terminal 72 permits a relatively undiminished feedback to oppose the acceleration input such that acceleration circuit 52 is effectively disabled, and only a deceleration control is possible. A measure of the rate of change of the negative frequency deviation input signal on lead 30 is also determined in the differentiator circuit comprising capacitor 34 and resistance 36, and a negative deceleration signal caused to arise thereby on lead 32 is processed by amplifier 28 and its feedback circuit which now in response to negative input produces at positive feedback current in opposition to the negative input. In a manner corresponding closely to that disclosed for limiting circuit 52 in connection with an acceleration signal, limiting circuit 53 is preset by adjustment of switching tap 114 to determine the effect of the positive feedback on the charging time of capacitor 132, 134, 136 or 138. NPN-transistor 94 functions as an amplifier of the positive feedback when made conductive through the activation of limiting circuit 53. Since the full impact of the feedback is applicable in the deceleration limiting circuit when switching tap 114 is adjusted to terminal 112, a relay trip control in accordance with the invention remains effective only with respect to acceleration signals.

Negative and positive signals appearing at differentiator output juncture 64, resulting from acceleration and deceleration input signals, respectively, are processed in inverting amplifier 130, in accordance with the time constant preset in the amplifier feedback circuit, and delivered as positive and negative signals, respectively, at the amplifier output juncture 202. The amplifier 130, operating with a gain of two, cooperates as was hereinbefore indicated, with a filter circuit established by resistance 152 in parallel with a selected capacitor in the amplifier feedback circuit such that the voltage limit imposed on the differentiator stage determines the voltage level which the selected filter capacitor will charge toward. Assuming that the signal derived through this feedback cooperation provides a positive output from amplifier 130, there appears a corresponding signal at juncture 202 and in the base-biasing circuit of NPN-transistor 172, which includes variable resistor 218, and a forward biased diode 226 in leads 222, 224 and 226. Transistor 172, normally cut off by the $-v$ voltage applied to the transistor base juncture 227 by way of the biasing circuit including resistor 209 in leads 211 and 213, responds to a summation of its cutoff voltage and positive input voltage and conducts in a circuit traceable from the $+v$ voltage on lead 176, resistors 182 and 184, the collector-emitter of the transistor and lead 196 to ground lead 192. A resultant negative bias on the base of PNP-transistor 230, due to the potential made less than $+v$ voltage by the drop across resistor 182, and the $+v$ voltage applied at the transistor emitter by way of forward biased diode 232, causes this transistor to conduct in a circuit traceable from the $+v$ voltage, diode 232, the emitter-collector of the transistor, leads 237, 238, through the relay coil and lamp circuits connected in parallel, and to ground lead 192. Energization of relay coils 240 and 242, occurs simultaneously, along with illumination of operation indicator lamp 244. Coil 240 is part of a momentarily energized relay which drops out when the capacitor 248 has charged sufficiently to limit the holding current of this relay. In addition, a positive signal is fed back to the base of transistor 172 by way of a reset circuit traceable from transistor 230 conducting in the relay driver circuit on leads 237, 238, resistor 264, lead 266, forward biased diode 268, lead 270, normally closed reset switch 262, and lead 213 to the base juncture of transistor 172. The driver circuit is thereby maintained locked in operating condition until reset switch 262 is opened to remove the requisite operational biasing potentials from transistors 172 and 230.

When a negative signal derived in time constant stage 14 appears at output juncture 202, a circuit from $+v$ voltage lead 176 to the negative juncture is activated, and current flows through diode 204, now forward biased, and resistances 198 and 206, in leads 208, 210, 212, 200 and 177. Current drawn through resistors 198 and 206 developes a positive potential in their connective circuitry, including leads 200 and 212, and at the base of transistor 170 connected thereto, which is sufficient to forward bias the transistor into conduction. A circuit is completed thereby from $+v$ voltage on lead 176 to ground by way of resistor 174, the collector-emitter of transistor 170, and leads 194 and 192, establishes a positive potential on the circuitry from lead 180 to the juncture 277 at the base of transistor 172, by way of the forward biased diode 214. Transistor 172 is caused to conduct thereby, and in the manner previously explained in connection the circuit action in response to a positive signal arising from acceleration, this transistor drives transistor 230 into conducting in circuits energizing relay coils 240 and 242, and indicating light 244.

Since the relay is normally driven by bus voltage or terminal voltage, it will be slightly sensitive to the phase shift which occurs at the time of fault. This phase shift is likely to be detected by transducer 10 as a momentary frequency change and sufficient time delay is added by a short time constant T, resulting from action of resistor 36 up on charging of capacitor 34 and by using an adjustable time constant setting in stage 14 which avoids false operation on such transient conditions. A time delay of at least 2 to 3 cycles is desirable to insure that the relay will respond to true acceleration. If extreme speed and immunity to phase shift are needed compensation for generator quadrature reactance is provided by a standard single-phase reactance drop compensator 272. This feature enables transducer 10 to sense frequency of internal machine voltage. Thus, the acceleration sensed by the relay is that of the machine rotor without vulnerability to angular shift of terminal voltage. This compensator requires one phase current from the generator current transformer secondary. It develops a reactance voltage proportional to current at a ratio controlled by tap dials employed in the compensator. The reactance voltage is added in series with phase voltage at terminals on the relay. An incidental advantage of the compensation is that the driving signal cannot be lost even by a fault at the machine terminals.

Various modifications of the invention are possible without departing from the conception thereof, particularly in details of construction. For example, where it is necessary to reduce inherent delay time in the operation of the relay a solid-state switch, such as a thyristor, can be used in lieu of the electromechanical trip relay device disclosed herein.

What is claimed is:

1. Acceleration and deceleration monitoring relay having means deriving frequency deviation signals, and comprising differentiator means producing in response to receipt of said deviation signals therein a further signal representative of the rate of change of said frequency deviation signals, said differentiator means having cooperatively related therein an operational amplifier to which are operatively connected as feedback inputs thereto a sensitivity adjustment means and a settable signal limiting means, a further operational amplifier connected to said differentiator means and to which is operatively connected as a feedback input thereto a settable signal timing means, said further amplifier being responsive to an input of said rate of change signals for producing relay activation control signals which reach an effective control magnitude in a time determined by the setting of said settable signal timing means, relay actuating devices and an energizing voltage source therefor having in operative association therewith a switching arrangement connected to said further operational amplifier and operatively responsive to said activation control signals supplied thereto from said further amplifier to activate said devices from said energizing source.

2. The relay of claim 1 wherein said differentiator means comprises circuitry having a capacitor element chargeable with positive and negative signals arising from an acceleration and deceleration, respectively, of said frequency deviation, and said signals limiting means thereof comprising first and second limiting circuits, adapted to affect acceleration and deceleration signals, respectively, each having connected therein an associated set of resistors in series and having connections in said first and second limiting circuits to positive and negative source voltages, respectively, and to an output terminal of said differentiator amplifier, an adjustable conductive tap contact for each said resistor set settable to adapt said resistor set associated therewith as a voltage divider which determines the magnitude of an opposing signal in said related feedback input to said differentiator amplifier.

3. The relay of claim 2 wherein said sensitivity adjustment means comprises a potentiometer having the resistance element thereof connected between said differentiator amplifier output terminal and at a ground between said positive and negative voltage sources, and an adjustable tap thereof connected through a feedback resistor to an input terminal of said differentiator amplifier, and each of said limiting circuits further comprising a transistor amplifier in the respective feedback circuit connections thereof.

4. The relay of claim 1 wherein said further operational amplifier comprises in said feedback input of said signal timing means thereof a circuit including a graduated set of capacitors connected together at one terminal thereof to an output terminal of said further amplifier and having the opposite terminals of said capacitors individually connected to separate terminals, and a conductive tap selectively adjustable to one of said opposite terminals to complete a conductive path through a selected capacitor for said feedback input, and a resistor connected in parallel with said circuit path.

5. The relay of claim 1 wherein said switching arrangement includes first and second switching transistors and a transistor amplifier in a circuit adapted to connect said energizing voltage source to said relay actuating devices, a further circuit coupling an output terminal of said further operational amplifier to said first and second transistors, said further circuit including oppositely poled diodes in respective branch circuits thereof adapted to selectively apply said control signal in accordance with the polarity thereof to a trigger-circuit for a predetermined one or the other of said first and second transistors, a collector to base circuit coupling said first transistor to said second transistor, and a collector to base circuit coupling said second transistor to said transistor amplifier, whereby energization of said triggering circuit of either said first and second transistor by said control signal obtains conduction of said second transistor and in turn of said transistor amplifier in said circuit connecting said voltage source to energize said relay actuating devices.

6. The relay of claim 1 wherein a reactance drop is connected to the input of said means producing said frequency deviation signals so as to compensate for any phase shift due to generator quadrature reactance.

* * * * *